Dec. 1, 1964  P. ABBÉ ETAL  3,159,507
SEPARATOR FOR GALVANIC CELLS
Filed April 22, 1960
 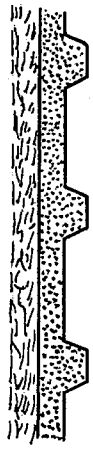  
Fig.1  Fig.2  Fig.3  Fig.4
 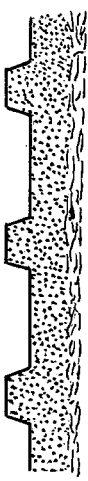 
Fig.5  Fig.6  Fig.7
INVENTORS
PIERRE ABBÉ
GEORGES GENIN
BY P. M. Craig, Jr.
ATTORNEY

United States Patent Office 3,159,507
Patented Dec. 1, 1964

3,159,507
SEPARATOR FOR GALVANIC CELLS
Pierre Abbé, Paris, and Georges Génin, Nanterre, France, assignors to Compagnie Generale d'Electricite, Paris, France, a French corporation
Filed Apr. 22, 1960, Ser. No. 24,083
Claims priority, application France May 20, 1957
16 Claims. (Cl. 136—145)

The present invention relates to separators for use in galvanic cells, more particularly, a separator-retainer combination made entirely of glass fibers which are resistent to the action of the electrolytes in storage batteries so that the insulating characteristics of the combination will not change or deteriorate during the life of the battery.

This application is a continuation-in-part of application Serial No. 711,586, filed January 28, 1958 and now abandoned.

Several problems must be considered and solved in order to obtain a satisfactory separator in galvanic cells. It is well known that the separator must not only maintain certain insulating properties, but must also serve, at least to some extent, as supporting structure within the battery cell and be able to accommodate the ionic action, as well as physical changes due to expansion and contraction of cell components during charging and discharging of the cell.

Separators of the type to which the present invention pertains must constitute between electrodes of opposite polarity an effective barrier preventing the passage of infinitely small particles of active material from one electrode to the other, and hence the undesired establishment, between these electrodes, of bridges of materials capable of promoting the formation of internal short-circuits. At the same time, they must offer minimum resistance to the passage of current, that is to say the circulation of ions, as also to the diffusion of the constituents of the electrolyte which are likely to participate in the reactions which take place around the electrodes during charging or discharging.

In some particular cases, as for example in the case of lead storage batteries, and generally speaking of any galvanic cell containing a material capable of varying in volume in the course of successive charging and discharging, they must be capable of providing a support or retainer for this active material, preventing it from swelling or becoming detached or deformed.

The separators must also permit and facilitate the liberation of the gases which are produced at the electrodes during charging and in particular at the end of prolonged overload, and they must maintain a constant spacing between the electrodes of different polarity.

Finally, the separators must possess properties of mechanical resistance to dislodging, elongation and flexure forces, as also a complete chemical resistance to the compounds which are formed in the course of the operation of the cells, in particular to oxidizing agents, in order that their useful life may be at least equal to that of the electrodes contained in the cells.

The chemical resistance properties and the mechanical properties of glass are more suitable than those of any other material such as wood, rubber and plastic materials, heretofore employed for the construction of separating members.

However, glass has hitherto been employed in the production of separating members almost exclusively in the form of a matting of glass filaments which, while having the properties of chemical resistance, elasticity and porosity required for facilitating the evolution of gas, have not, in this matted form, the necessary mechanical rigidity and sufficiently small pores to prevent the passage of the particles of active material. On the other hand, the agglomerated glass plates which are obtained by initial fusion, at appropriate temperature, of glass filaments having a diameter of the order of several microns, for example 4 microns, have sufficiently fine pores defined by the glass filaments themselves, after they have been initially or partially fused together, to prevent the aforementioned passage of the particles of active material, and adequate mechanical properties, more especially resistance to compression. However, the smooth surface of such plates does not ensure ready liberation of the gases and does not possess the required properties of elasticity for maintaining and exerting a constant pressure on the active materials.

Among the objects of the present invention is to provide a generally improved form of separator for galvanic cells using at least a layer of glass fibers and meeting the aforementioned requirements of a separator with satisfaction.

More specifically, it is an object of this invention to provide an improved battery separator in which the porosity of at least a part of the separator is reduced to extremely fine pores to block the passage of the aforementioned active material from one electrode to the other while permitting the free circulation of the ions and at the same time providing in the separator a retainer portion facilitating the escape of generated battery gases and serving to effectively maintain active material on the electrodes.

Still another object of this invention is to provide an improved battery separator of the aforementioned type which is made of a single type of material and which is so formed as to be a self-supporting structure which will retain its general configuration, while at the same time provide a desired amount of resiliency in the direction perpendicular to the faces of the separator.

Still another object of the present invention is to provide a battery separator made wholly of glass fibers and including a plurality of juxtaposed layers of relatively rigid microporous agglomerated fibers and a relatively more porous and more resilient layer of fibers.

Another object of the present invention is to provide a battery separator which is not only substantially inert from the standpoint of chemical action within the battery cell, but which also may provide irregular, uneven or nonplanar surface configurations, as desired, to meet different conditions, both from the standpoint of structure as well as from the standpoint of operation and gas liberation within the cell.

Still another object of this invention is to achieve an improved battery separator having optimum chemical resistance and desirable physical qualities which permit construction of batteries having a very high instantaneous discharge intensity and in which the active material of the electrodes is efficiently protected against deterioration.

The foregoing and other objects of the invention are achieved by providing in the separator at least one layer of glass fibers which are agglomerated by initial or partial fusion to provide a relatively rigid microporous layer which will effectively separate battery cell components to prevent the transfer of undesirable active particles therebetween, while at the same time permitting the ion transfer in the electrolyte. This aspect of the invention is more particularly achieved by initial or partial fusion of glass fibers having a diameter of the order of 4 microns, which fibers, while being of the same or similar mineral content, have different temperatures at which the fibers soften so that only part of the fibers are fused during an agglomerating process. The microporous layer is preferably provided with an additional relatively more porous and resilient juxtaposed layer which serves as a retainer and which is substantially coextensive with the microporous layer and which facilitates the escape of battery gases and accommodates the changing dimensions of cell components during operation of the battery. The resilient layer is preferably likewise made of matted glass fibers which may also be partially held together by fusion and secured to the microporous layer also by partial fusion.

The structure according to the present invention is such that it may be described as being chemically homogenous and physically heterogeneous because of the similarity of chemical composition of the glass fibers of the various layers. In certain instances, however, it may be desired that the separator be impregnated with any suitable synthetic resin having hydrophilic properties to improve the wetting of the separators by the electrolyte of the battery. Although such resin may provide some degree of reinforcing of the structure, the separator is, nevertheless, preferably formed so as to be self-supporting even in the event the resin is eliminated by disintegration or other chemical action during operation of the battery.

The invention further contemplates that the consistency and density within each of the microporous and resilient layers is substantially uniform throughout each of the respective layers. Also, it is contemplated that the layer of fibers formed by partial fusion is achieved by controlling the rate of heating of the fibers and including in the processing of the separator the humidifying of the fibers before agglomeration as by sprinkling or immersion. Such moistening provides improvement in the state of the surface of the agglomerated layer and also permits an increase in density of the layer, and a decrease of the shrinkage. Such moistening permits the temperature prior to agglomeration to be lower.

Although the same mineral content may be used in the glass fibers of the separator, the fibers may have different softening temperatures, dependent in part on the diameter of the fibers, and also due to the process by which the fibers are obtained, as, for example, by varying the formation temperature and/or the cooling temperature in making to the fibers prior to the steps of making the separator. Such fibers as have different softening temperatures may be obtained in accordance with conventional prior art techniques, for example, as described in the French Patent 1,149,289 and in the first addition No. 69,573, filed May 11, 1956, and the second addition No. 1,306, filed June 15, 1957. Thus, in the resulting variations in the thermoplastic properties or softening temperatures of different fibers, the fibers may be joined by partial initial fusion without reaching the stabilizing point at which all the fibers are fused.

The heating of the layers to obtain partial initial fusion may be carried out, for example, in a continuous process in any suitable controlled furnace followed by partial compression of the layer as by passing it between rollers or other calendering devices at a temperature equal to or less than the temperature of that required for the desired agglomeration. The superficial characteristics of the separator layers may be modified to some extent by varying the temperature of the rollers.

The apparatus for obtaining the foregoing and other objects and features of the invention may become more clear by referring to the following description, given merely by way of example, and by reference to the accompanying drawings wherein:

FIGURE 1 is a partial section at a plane perpendicular to the faces of a flat battery separator in which a resilient cushion of glass filaments is juxtaposed on the rib face of a relatively dense microporous layer of fibers agglomerated by partial fusion;

FIGURE 2 is a similar section of a resilient layer of glass fibers juxtaposed on the plane face of a ribbed agglomerated layer;

FIGURE 3 illustrates in a similar section two resilient cushions juxtaposed on both the plane and ribbed faces of a layer agglomerated by partial fusion;

FIGURE 4 illustrates the juxtaposition of a resilient cushion of glass fibers and a layer of glass fibers agglomerated by partial fusion, each of the layers having generally flat surfaces;

FIGURES 5 and 6 are sections somewhat similar to that of FIGURE 2 but in which the relative thicknesses of the dense microporous layer and the resilient cushion layer are different, the respective layers being joined by partial fusion; and FIGURE 7 is a section similar to that of FIGURE 1, but illustrating the cushion layer bonded on the rib face of the densified layer by partial fusion.

As indicated in the drawings, each of the layers having a dotted or speckled section represents a layer of glass fibers which are agglomerated by partial initial fusion. This layer is not only relatively more dense than the other layer which is matted, but also has substantial rigidity as compared with the other layer whereby it will resist forces which tend to flatten it further when it is positioned between elements to be separated within the battery cell and will also render the separator self-supporting both within the battery and during handling in battery assembly thereby facilitating the latter. This densified agglomerated layer may be ribbed or corrugated to define reinforcing zones on at least one face whereby the total thickness may vary along certain cross sections in the direction crosswise of the ribs.

The drawings illustrate at least one matted layer on at least one face of the densified layer and this matted layer may be juxtaposed at the planar face and/or at the rib face of the densified layer.

The examples illustrated in FIGURES 1 through 4 represent the matted layers joined to the densified layers by sticking, fusion or other known adhering or bonding methods.

With regard to FIGURE 4, both the matted layer and the densified layer of the separator have generally flat planar surfaces and the structure comprising these juxtaposed layers as a whole may be preferred for use when the electrolyte of a battery must be retained inside the pores of the separator.

A structure similar to that shown in FIGURE 4 may be achieved by joining two separately formed layers, or, in the alternative, it may be achieved by differential heating of the opposite faces of a single layer of fibers whereby one face may be produced with a relatively different density and consistency with respect to the other face and the pores near the relatively more dense face may be microporous in nature to block the active particles of the battery and the other face may have sufficient resiliency to function in the manner of the cushion layers mentioned herein. The mean temperature to which the layer is subjected may be of the order of several hundred degrees centigrade and the temperature differential between the opposite faces of the layer may be of the order of 100° to 200° C. The differential heating of the opposite faces may be obtained in any desired manner and may even be obtained by the use of heated calendering rollers. A similar differential heating technique may be used for the structure of other illustrated embodiments.

In FIGURES 5 and 6, a ribbed separator is constituted by two zones obtained by partial fusion for agglomeration of glass filaments of different diameters and compressions or resiliencies. The ribbed part of the separator is a densified layer of glass filaments, partially fused, having a diameter of the order of 4 microns, this layer being highly compressed. The other relatively resilient layer is formed by a fibrous cushion of glass filaments having a diameter of the order of 15 to 20 microns and having limited settling with respect to each other to retain the resilient character of this layer. As pointed out hereinabove, the respective layers of FIGURES 5 and 6 are joined to each other by partial fusion and in FIGURE 5 the densified layer includes the ribbed portions with only a small thickness of this layer defining a web portion interconnecting the several ribs. On the other hand, FIGURE 6 represents an arrangement similar to that of FIGURE 5, but in which the fibrous cushion layer constitutes but a small thickness of the whole separator, this thickness being small in proportion to the thickness of the dense layer.

FIGURE 7, like FIGURE 1, illustrates the cushion layer supported on the ribs of the densified layer and in this instance joined thereto by partial fusion of the contacting faces of the respective layers.

If desired in these embodiments, the union obtained by initial fusion of the glass fibers may be reinforced by impregnation of the separator with an appropriate synthetic resin of hydrophilic character in order to avoid delay of the wetting of the separator by the electrolyte of the galvanic cell. However, it is understood that the invention may be fulfilled by the structure constituted entirely and solely of glass fibers.

As pointed out hereinbefore, agglomeration of the densified layer may occur by the partial fusion of the part of this layer consisting of fibers of substantially lower softening temperature than other fibers therein. The fibers with the lower softening point may have such characteristics due to their respective diameters or the manner in which they have been obtained. Reference is made to the French Patent 1,149,289 and the addition certificates thereto filed May 11, 1956, and June 15, 1957, respectively, for further information regarding the processing of glass fibers.

The aforementioned French Patent 1,149,289 describes the agglomeration of a mixture of at least two different types of glass fibers, constituted of the same material but having different softening temperatures. Glass fibers of the same material but differing in softening temperature, according to this patent, may be obtained by subjecting fibers of the same diameter or of different diameters to different cooling conditions, and/or to different fiber forming temperatures and/or to different quenching conditions of the fibers. Also described in this patent are typical examples of compositions that may be used for the glass as well as typical examples of mixtures of glass fibers of differing diameters.

The agglomeration of the fibers to achieve the structure of the present invention can be performed only to the extent necessary to ensure cohesiveness and the shape of the product desired. The temperatures to which the fibers are heated may be in the range of 400° to 700° C., but the particular temperatures necessary will be dependent on the particular nature of the glass material used. The aforementioned diameters of the glass fibers of the respective layers may be preferred averages, but for any respective layer the quantity of fibers having a diameter substantially smaller than this average has a preferable minimum, whereas the quantity of fibers having a diameter substantially greater than this average should not exceed a maximum that is a relatively small part of the whole.

The heating operation should be carefully controlled as to temperature and should be such that the fibers may be heated sufficiently fast to avoid fusion of more than just a superficial part of the fibers whereby some of the fibers retain their initial characteristics without being softened during the agglomerating process. Finally, it is to be preferred that the respective layers of the separator each have a definite fusion temperature at which partial fusion is attained, a definite mean fiber diameter and a definite density achieved perhaps by compression of the respective layer during a partial fusion process. The nature of the separator achieved by the present invention renders it quite suitable to meet all the required conditions both as to structure and function within a battery and to be used between two battery electrodes without having to resort to any other separating device therebetween.

The foregoing examples are given merely by way of illustration and are not intended to restrict the invention, except as the latter is defined in the following claims.

We claim:

1. In a storage battery having therein an electrolyte, a pair of electrodes of opposite polarity and a separator between the electrodes, the improvement in which the separator consists entirely and solely of glass fibers agglomerated by partial fusion, said glass fibers having the same mineral composition and having insulating properties highly resistant to the battery electrolyte and being of different thermoplastic characteristics, some of said fibers having a lower softening temperature than others to insure the close agglomeration of fibers by fusion and superficial vitrification of the fibers having the lowest softening point.

2. A separator according to claim 1, wherein the glass fibers having the lower softening temperature have a diameter of the order of four microns.

3. In a storage battery having therein an electrolyte, a pair of electrodes of opposite polarity and a separator between the electrodes, the improvement in which the separator consists entirely and solely of glass fibers agglomerated by partial fusion, said glass fibers being entirely resistant to battery electrolyte and having different thermoplastic characteristics, some of said fibers having a lower softening temperature insuring close agglomeration of the fibers by partial fusion and superficial vitrification of the fibers having the lower softening point.

4. A separator according to claim 3, obtained by quenching the fibers having the lower softening temperature.

5. A separator according to claim 3, wherein said fibers are of different diameters, the fibers with the lower softening temperature having a smaller average diameter of the order of 4 microns.

6. A separator according to claim 3, wherein the consistency and density of the separator are constant throughout the mass of the separator.

7. A separator according to claim 3, wherein the fibers are arranged in at least two layers of different consistency and density, respectively, one of said layers being microporous and relatively rigid with respect to the other layer which is elastic and substantially more porous.

8. In a storage battery having therein an electrolyte, a pair of electrodes of opposite polarity and a separator between the electrodes, the improvement in which the separator consists of a plurality of juxtaposed layers of glass fibers including a layer of glass fibers agglomerated by partial fusion and superficial vitrification of only part of the glass fibers thereof and a further layer of matted glass fibers adjacent to said first-mentioned layer, said layer of agglomerated glass fibers being relatively more rigid than said further layer to make said separator essentially self-supporting, the glass fibers of the layer agglomerated by partial fusion being of such size and so fused to each other as to define sufficiently small pores to prevent the undesired passage of particles of active material therethrough, the pores, however, extending through said separator to provide circulation of electrolyte therethrough.

9. A separator according to claim 8, wherein the layer of glass fibers agglomerated by fusion and vitrification is microporous and does not flatten out under internal battery pressure, whereas the layer of matted glass fibers is porous and relatively more elastic.

10. A separator according to claim 9, wherein the adjacent layers are bonded together.

11. A separator according to claim 10, in which the two layers bonded together are joined by partial fusion and partial vitrification of the contacting surfaces of said layers.

12. A separator according to claim 9, wherein the thickness of the microporous layer is varied to present a nonplanar surface at at least one face thereof.

13. A separator according to claim 9, wherein the microporous layer has at least one ribbed face.

14. A separator according to claim 9, wherein said microporous layer has at least one planar face.

15. A separator according to claim 9, wherein said microporous layer is impregnated with a hydrophilic synthetic resin.

16. A separator according to claim 9, wherein said microporous layer is corrugated.

References Cited in the file of this patent

UNITED STATES PATENTS

| | | |
|---|---|---|
| 1,938,982 | Smith | Dec. 12, 1933 |
| 2,336,797 | Maxwell | Dec. 14, 1943 |
| 2,677,007 | Jensen | Apr. 27, 1954 |
| 2,872,497 | Beckvold et al. | Feb. 3, 1959 |
| 2,978,529 | Brisley et al. | Apr. 4, 1961 |

FOREIGN PATENTS

| | | |
|---|---|---|
| 475,464 | Great Britain | Nov. 19, 1937 |
| 69,573 | France | May 11, 1956 |
| 1,149,289 | France | July 8, 1957 |